(12) United States Patent
Kimura et al.

(10) Patent No.: US 7,397,732 B2
(45) Date of Patent: Jul. 8, 2008

(54) OBJECTIVE LENS DRIVING APPARATUS AND OPTICAL DISC APPARATUS

(75) Inventors: Katsuhiko Kimura, Chiyoda (JP); Hiroshi Ogasawara, Yokohama (JP); Hidenao Saito, Yokohama (JP)

(73) Assignee: Hitachi Media Electronics Co., Ltd., Mizusawa-Shi (JP)

( * ) Notice: Subject to any disclaimer, the term of this patent is extended or adjusted under 35 U.S.C. 154(b) by 549 days.

(21) Appl. No.: 11/109,659

(22) Filed: Apr. 20, 2005

(65) Prior Publication Data
US 2005/0281143 A1 Dec. 22, 2005

(30) Foreign Application Priority Data
Jun. 16, 2004 (JP) ............................. 2004-177718

(51) Int. Cl.
*G11B 7/00* (2006.01)
(52) U.S. Cl. .................................. 369/44.14; 369/44.15
(58) Field of Classification Search ........................ None
See application file for complete search history.

(56) References Cited

U.S. PATENT DOCUMENTS 4,473,274 A * 9/1984 Yano et al. .................. 359/824
5,136,565 A * 8/1992 Ooyama et al. .......... 369/44.14
5,859,831 A * 1/1999 Naito et al. .................. 720/728
6,466,529 B1 * 10/2002 Kim et al. ................. 369/44.32

FOREIGN PATENT DOCUMENTS

JP 2001-266379 9/2001
JP 2003-168230 6/2003

* cited by examiner

*Primary Examiner*—Thang V. Tran
*Assistant Examiner*—Peter Vincent Agustin
(74) *Attorney, Agent, or Firm*—Antonelli, Terry, Stout & Kraus, LLP.

(57) ABSTRACT

The invention provides an objective lens driving apparatus in which an efficiency of a magnetic circuit is improved by making a magnetic flux density distribution of the objective lens driving apparatus close to symmetrical. An objective lens driving apparatus has an objective lens, a tracking coil driving the objective lens in a tracking direction, a focusing coil driving the objective lens in a focusing direction, and a yoke arranged so as to oppose to the tracking coil and having a permanent magnet attached thereto. The yoke has a bottom plate portion and an outer yoke bent approximately perpendicularly to the bottom plate portion from an outer edge portion of the bottom plate portion, has a first yoke having an opening formed in a center portion thereof, and a second yoke having a bottom plate portion and an inner yoke bent approximately perpendicularly to the bottom plate portion from an inner edge portion of the bottom plate portion, and having an opening formed in a center portion thereof.

4 Claims, 6 Drawing Sheets

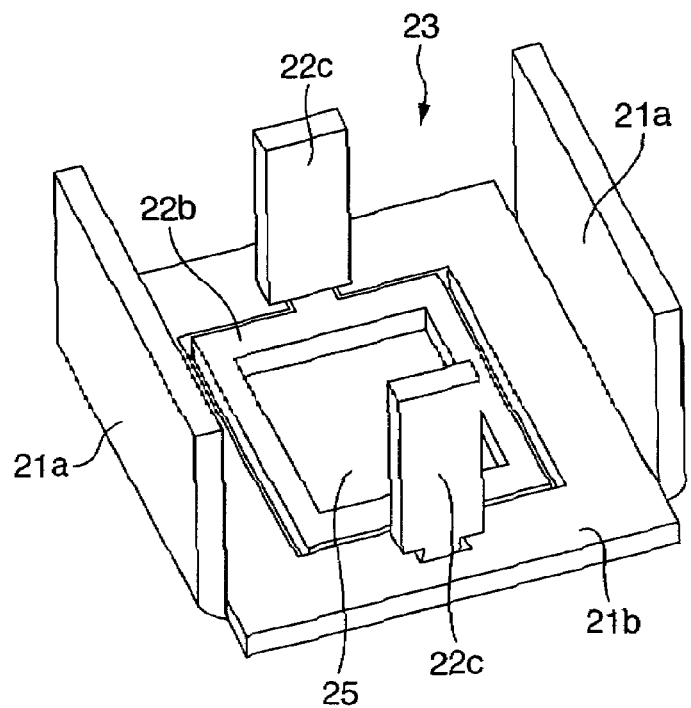
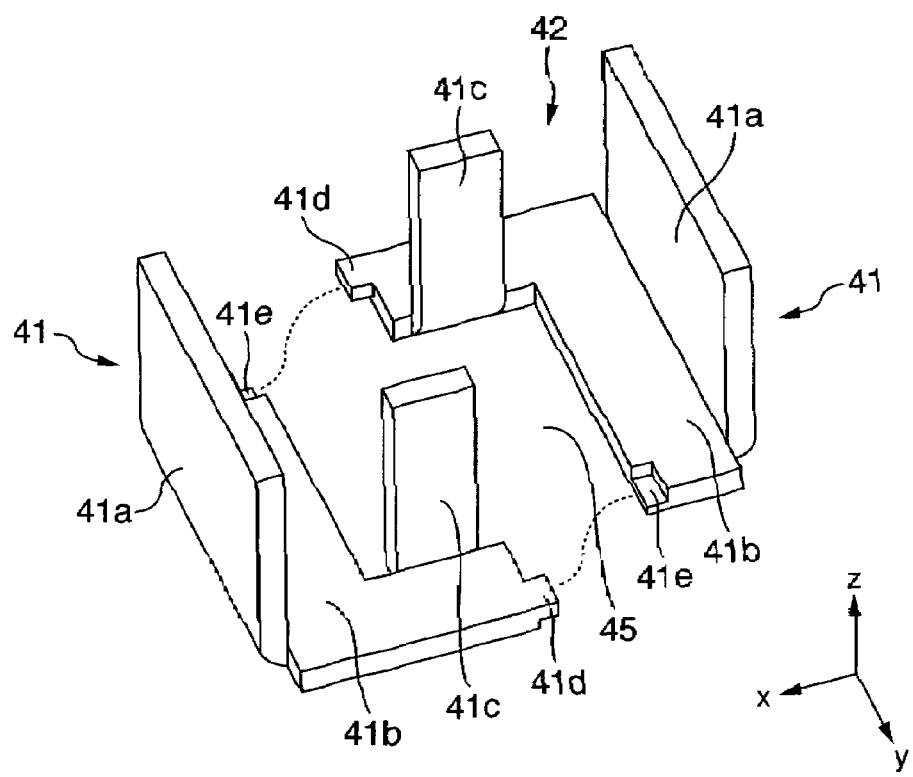

OBJECTIVE LENS DRIVING APPARATUS AND OPTICAL DISC APPARATUS

BACKGROUND OF THE INVENTION

The present invention relates to an optical disc apparatus reading an information recorded on a recording surface of an optical disc and recording an information, and an optical pickup and an objective lens driving apparatus used therefore.

In the optical disc apparatus, in order to make recording and reproducing speeds of the information high, there has been known a method of making a rotating speed of the optical disc high. In accordance that the optical disc rotates at a higher speed, it is necessary to increase a driving force generated in a focusing coil and a tracking coil in order to make the objective lens driving apparatus to track the optical disc rotating at a high speed.

Accordingly, in order to increase the driving force of the objective lens driving apparatus, for example, in an optical disc apparatus described in patent document 1 (JP-A-2003-168230 (page 9, FIG. 9)), two branch yokes branched from a magnetic yoke are provided in a standing manner so as to be extended between focus coils. Therefore, an efficiency of a magnetic circuit is increased by increasing a rate of a coil portion generating an effective driving force with respect to an entire length of the coil.

In the conventional optical disc apparatus described in the patent document 1, since the branch yokes are arranged in an inner side of a bottom plate portion of the magnetic yoke, it is impossible to increase a height of the branch yokes in the case that the branch yokes are manufactured by being cut up from the bottom plate portion of the magnetic yoke. In other words, since the cut-up portion is manufactured in such a manner that the heights of the branch yokes are uniform while taking an uniformity of the magnetic circuit into consideration, it is unavoidable that the height of the branch yoke is equal to or less than one half of the height of the cut-up portion. In order to solve the problem, a thickness of the bottom plate portion is reduced by extending the bottom plate portion forming the branch yokes, whereby the height of the branch yokes is increased.

However, in accordance with these methods, in the case that the height of the branch yoke is reduced, a distribution of magnetic flux density becomes non-uniform in a height direction, and a dispersion of a driving force driving the objective lens driving apparatus is increased. Further, if the branch yoke becomes thin, a cross sectional area of a magnetic path becomes small, an efficiency of a magnetic circuit is lowered, and a complex working step is required. As a result, it is impossible to increase the driving force of the objective lens driving apparatus on the basis of any method.

On the contrary, if the branch yokes are cut up from an outer edge of the bottom plate portion of the magnetic yoke, the height and the thickness of the branch yokes can be set to predetermined values. However, since it is necessary to guide a laser light to an objective lens in the objective lens driving apparatus, an opening at least equal to or larger than a light flux of the light guided to the object lens is necessary in the bottom plate portion of the magnetic yoke. Since a width of the bottom plate portion from the opening to the branch yoke is limited, a cross sectional area of the magnetic path is lowered.

BRIEF SUMMARY OF THE INVENTION

The present invention is made by taking the problem in the prior art mentioned above into consideration, and an object of the present invention is to make a magnetic flux density distribution of an objective lens driving apparatus close to symmetry, thereby increasing an efficiency of a magnetic circuit. The other object of the present invention is to provide an optical pickup or an optical disc apparatus which can record and reproduce an information at a high speed by using an objective lens driving apparatus having an improved symmetric property of the magnetic flux density and a high efficiency of the magnetic circuit.

In order to achieve the object mentioned above, in accordance with an aspect of the present invention, there is provided an objective lens driving apparatus comprising:

an objective lens;

a tracking coil driving the objective lens in a tracking direction;

a focusing coil driving the objective lens in a focusing direction; and a yoke arranged so as to oppose to the tracking coil and having a permanent magnet attached thereto, wherein the yoke has a first yoke and a second yoke, and each of the first yoke and the second yoke has a pair of yoke portions formed in parallel.

Further, in this aspect, it is preferable that the first yoke has a bottom plate portion and has a center portion in which an opening is formed, the yoke portion of the first yoke is constituted by an outer yoke formed in a shape which is curved approximately perpendicularly to the bottom plate portion from an outer edge portion of the bottom plate portion, the second yoke has a bottom plate portion and has a center portion in which an opening is formed, the yoke portion of the second yoke is constituted by an inner yoke formed in a shape which is curved approximately perpendicularly to the bottom plate portion from an inner edge portion of the bottom plate portion, and the first yoke and the second yoke are combined in such a manner that the outer yoke and the inner yoke are perpendicular to each other.

Further, it is preferable that the first yoke and the second yoke are assembled by fitting the inner yoke to the opening formed in the first yoke, and the structure may be made such that the inner yoke is formed in the first yoke, the first yoke and the second yoke are arranged in such a manner as to pinch the objective lens by the first yoke and the second yoke, and the inner yoke of the first yoke and the inner yoke of the second yoke are connected.

In order to achieve the object mentioned above, in accordance with the other aspect of the present invention, there is provided an objective lens driving apparatus for driving an objective lens in a tracking direction and a focusing direction of an optical disc, comprising:

a first yoke having a bottom plate portion and a flat plate portion parallel to the focusing direction and the tracking direction and forming an opening; and a second yoke having a bottom plate portion and a flat plate portion perpendicular to the focusing direction and forming an opening, wherein the flat plate portion of the second yoke is formed in a shape bent from an outer edge of the bottom plate portion of the second yoke, and the flat plate portion of the second yoke is fitted to a notch portion adjacent to the opening of the first yoke. Further, in this aspect, the structure may be made such that the bottom plate portion of the first yoke and the bottom plate portion of the second yoke are arranged so as to be overlapped, or the bottom plate portion of the second yoke is brought into contact with an inner side of the opening of the first yoke or arranged close thereto.

In order to achieve the object mentioned above, in accordance with further the other aspect of the present invention, there is provided an objective lens driving apparatus for driving an objective lens in a focusing direction and a tracking direction, comprising:

a first yoke having a bottom plate portion, an outer yoke parallel to a focusing direction and a tracking direction and a first inner yoke parallel to the focusing direction and perpendicular to the tracking direction and forming an opening; and a second yoke having a bottom plate portion and a second inner yoke perpendicular to the tracking direction and forming an opening, wherein the first inner yoke and the second inner yoke are connected.

In order to achieve the object mentioned above, in accordance with further the other aspect of the present invention, there is provided an objective lens driving apparatus for driving an objective lens in a focusing direction and a tracking direction, comprising:

a flat plate portion parallel to a focusing direction and a tracking direction; and two yokes each having only one flat plate portion perpendicular to the tracking direction, wherein two yokes are arranged in symmetrical to an optical axis of the objective lens.

In order to achieve the object mentioned above, in accordance with further the other aspect of the present invention, there is provided an optical disc apparatus or an optical pickup reproducing an information of an optical disc or recording an information to the optical disc, wherein the objective lens having the feature mentioned above is provided.

In accordance with the present invention, since a hole portion fitting the second yoke thereto is provided in a bottom portion of the yoke used in the objective lens driving apparatus, and the branch yokes are formed in the second yoke, it is possible to set a thickness and a height of the branch yokes to predetermined values, it is possible to improve a symmetric property of a magnetic flux density distribution, and it is possible to improve an efficiency of a magnetic circuit. Further, since the optical pickup or the optical disc apparatus is provided with the objective lens driving apparatus in which the symmetric property of the magnetic flux density distribution and the efficiency of the magnetic circuit are improved, it is possible to record or reproduce the information at a high speed.

Other objects, features and advantages of the invention will become apparent from the following description of the embodiments of the invention taken in conjunction with the accompanying drawings.

BRIEF DESCRIPTION OF THE SEVERAL VIEWS OF THE DRAWINGS

FIG. 5 is a perspective view showing an assembly of the yoke portion shown in FIG. 4;

FIG. 8 is an exploded perspective view of further the other embodiment of the yoke portion in accordance with the present invention.

DETAILED DESCRIPTION OF THE INVENTION

A description will be given below of some embodiments of an optical disc apparatus and an objective lens driving apparatus used therein with reference to the accompanying drawings.

Embodiment 1

Figure 3:
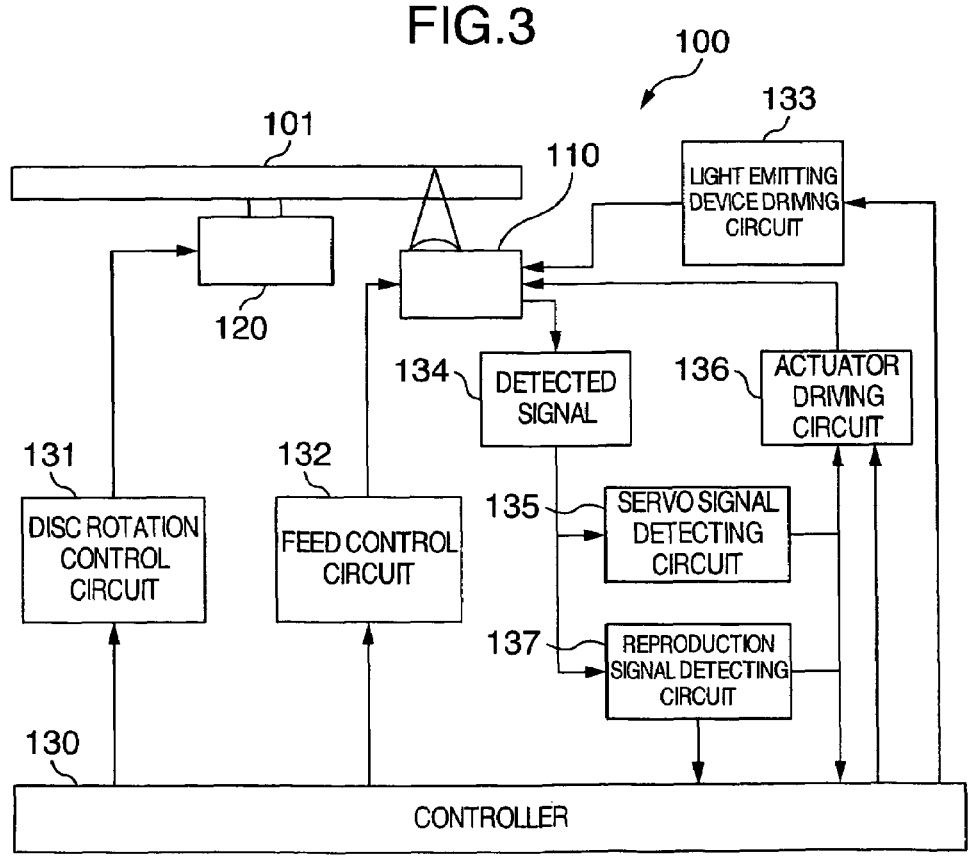
FIG. 3 is a block diagram of an embodiment of an optical disc apparatus in accordance with the present invention.

FIG. 3 shows a block diagram of an optical disc apparatus 100 in accordance with the present invention. The optical disc apparatus 100 is provided with a spindle motor 120 rotating an optical disc 101, and an optical pickup 110 reading an information from the optical disc or writing an information on the optical disc. The optical pickup has an objective lens driving apparatus mentioned in detail later, and an optical part such as a laser light emitting device or the like. The optical pickup 110 and the spindle motor 120 are controlled by a controller 130.

A disc rotation control circuit 131 is connected to the controller 130. The disc rotation control circuit 131 rotationally drives the spindle motor 120 mounting the optical disc 101 thereon on the basis of a command from the controller 130. A feed control circuit 132 is also connected to the controller 130. The feed control circuit 132 moves the optical pickup 110 in a radial direction of the optical disc 101 on the basis of a command from the controller 130.

A light emitting device drive circuit 133 is connected to the laser light emitting device mounted on the optical pickup 110. When a drive signal is output to the light emitting device drive circuit 133 from the controller 130, the laser light emitting device emits a laser light. A detected signal 134 detected by the optical pickup 110 is sent to a servo signal detecting circuit 135 and a reproduction signal detecting circuit. A servo signal is generated from the detected signal 134 sent to the servo signal detecting circuit 135, and is sent to an actuator drive circuit 136.

The actuator drive circuit 136 inputs a drive signal of the objective lens to the optical pickup 110, and controls so as to position the objective lens. On the other hand, a reproduction signal is generated from the detected signal 134 input to the reproduction signal detecting circuit 137, an information of the optical disc 101 is reproduced or an information is recorded on the optical disc 101.

A description will be given of details of an objective lens driving apparatus 50 provided in the optical pickup 110 shown in FIG. 3 with reference to FIGS. 1 and 2. In the following drawings, a direction (a focusing direction) of moving an objective lens 1 focusing the light to a recording surface on the optical disc close to or apart from the optical disc surface is set to a z direction, a radial direction (a tracking direction) of the optical disc is set to a y direction, and a direction orthogonal to both the y direction and the z direction is set to an x direction.

Figure 1:
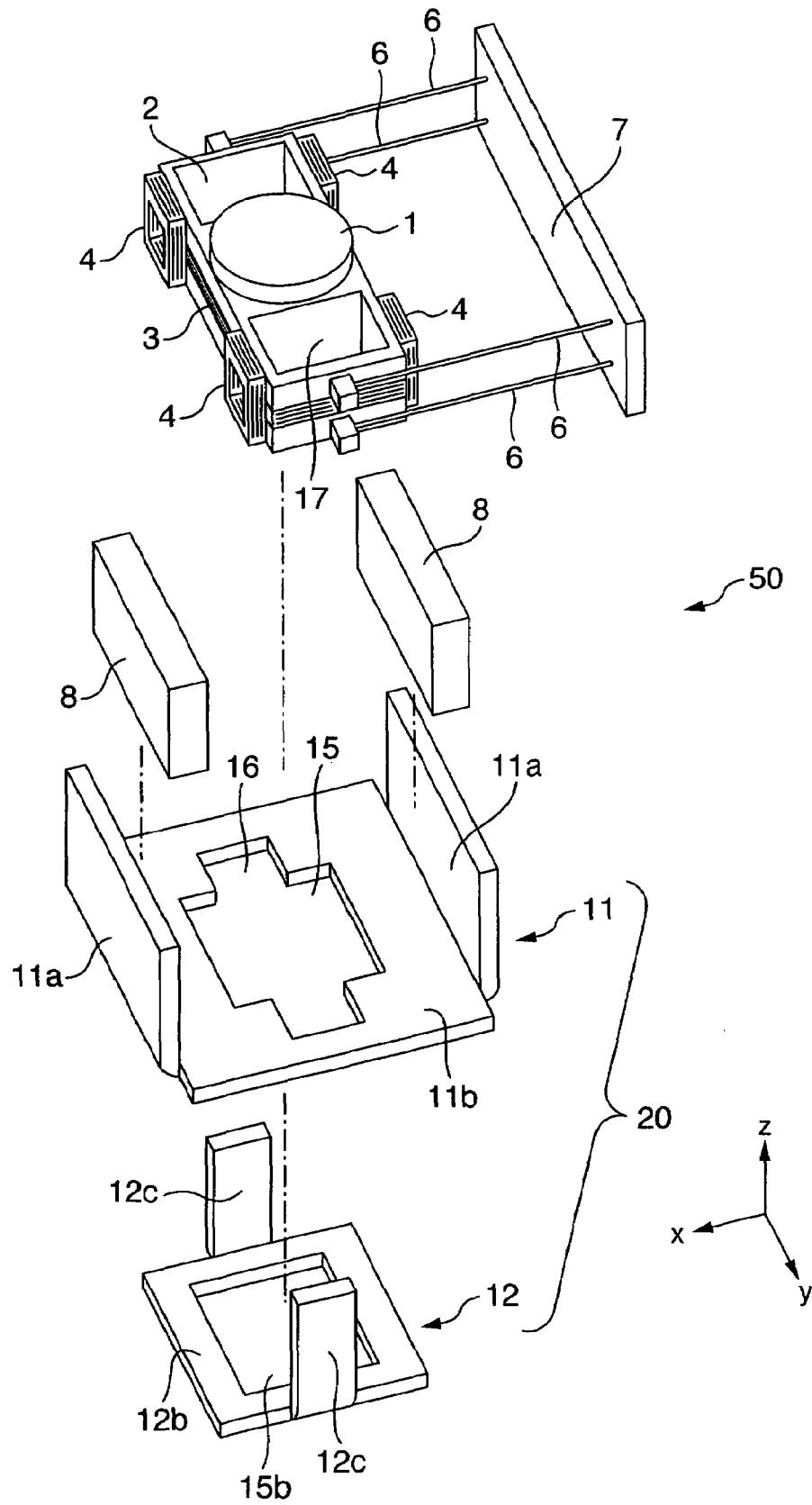
FIG. 1 is an exploded perspective view of an embodiment of an objective lens driving apparatus in accordance with the present invention.
Figure 2:
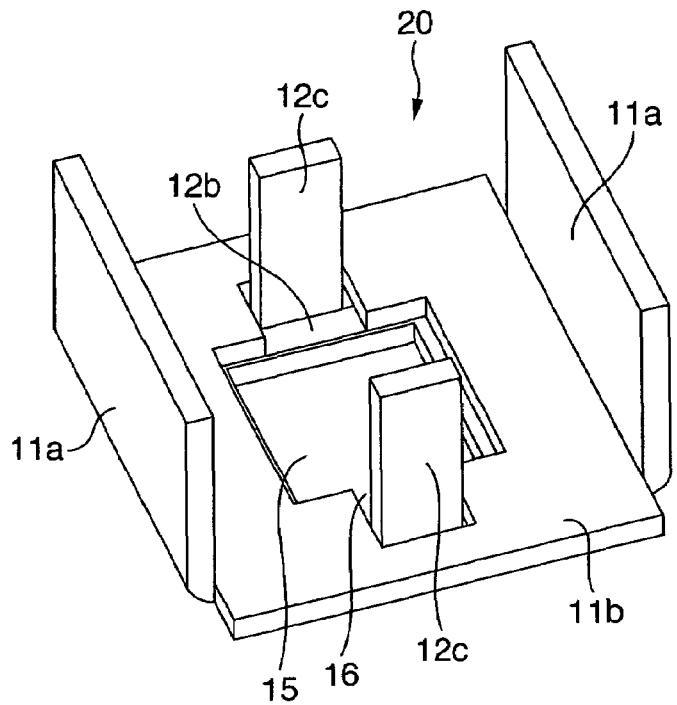
FIG. 2 is a perspective view of a yoke portion used in the objective lens driving apparatus shown in FIG. 1.

FIG. 1 is an exploded perspective view of an embodiment of the objective lens driving apparatus 50, and FIG. 2 is a perspective view of an assembled yoke 20 provided in the objective lens driving apparatus 50 shown in FIG. 1. In FIG. 1, an x-axis direction corresponds to a tangential direction of the optical disc (not shown), a y-axis direction corresponds to a tracking direction, that is, a radial direction of the optical disc, and a z-axis direction corresponds to a focusing direction, that is, an optical axis direction of the objective lens 1.

The objective lens driving apparatus 50 has a lens holder 2 having an approximately square pole shape, and a plate-like fixed portion 7 connected to the lens holder 2 via a support member 6. The objective lens 1 is attached to an inner center portion of the lens holder 2. A focusing coil 3 is arranged in both right and left sides in the y direction of the objective lens 1, and is attached to the lens holder 2. Two tracking coils 4 are attached respectively to two outer side surfaces opposing to the x direction of the lens holder 2 so as to be arranged in the y direction. Accordingly, the tracking coils 4 are separated into four coil portions.

The support member 6 is a wire-like member having a conductivity, two of which are provided in right and left sides. One end of the support member 6 is fixed to the fixed portion 7, and the other end is fixed to the lens holder 2. Four support members 6 supply a current to the focusing coil 3 and the tracking coil 4. A movable portion is formed by the objective lens 1, the lens holder 2, the focusing coil 3 and the tracking coil 4.

The yoke 20 to which the permanent magnet is attached is arranged in an inner portion, a bottom portion and a peripheral portion of the lens holder 2. In this case, an upper yoke engaging with the yoke 20 may be arranged in an upper portion of the lens holder 2. In the case that the upper yoke is provided, an efficiency of the magnetic circuit is improved. The yoke 20 has a first yoke and a second yoke 12 fitted to the first yoke, both of which are constituted by a magnetic body. An opening 15 in which a notch 16 for fitting is formed is formed in a bottom plate portion 11*b* of the first yoke 11. An outer yoke 11*a* is formed by being bent from an outer peripheral side of two opposing lines forming the bottom plate portion 11*b*. Permanent magnets 8 are attached to an inner surface side of the outer yoke 11*a* so as to oppose to each other. A magnetizing direction of the permanent magnet 8 is the x direction.

The second yoke 12 fitted to the first yoke 11 has an opening 15*b* guiding the laser light to the objective lens 1 formed in a bottom plate portion 12*b*, and an inner yoke 12*c* is formed by being bent from an outer peripheral side of two opposing lines. The inner yoke 12*c* corresponds to a flat plate which is perpendicular to the tracking direction. The first yoke 11 is arranged so as to oppose to the tracking coil 4, and the second yoke 12 is inserted to a through hole 17 formed in the focusing coil 3.

The first yoke 11 and the second yoke 12 are arranged in such a manner that the respective bottom plate portions 11*b* and 12*b* are overlapped. Since the second yoke 12 is fitted to the first yoke 11 by the inner yoke portion 12*c*, a magnetic flux from the permanent magnet 8 is guided to the bottom plate portion 12*b* from the inner yoke 12*c* of the second yoke 12, and is next guided to the bottom plate portion 11*b* of the first yoke 11 and the outer yoke 11*a*, whereby a magnetic circuit is formed.

In accordance with the present embodiment, since the inner yoke 12*c* of the second yoke 12 can be formed by being bent from the outer edge of the bottom plate portion 12*b* of the second yoke 12, no dimensional limit is provided in a yoke raw material in which the bottom plate 12*b* and the inner yoke 12*c* are integrally formed. Accordingly, a height and a thickness of the inner yoke 12*c* can be set to predetermined values.

Since the height of the inner yoke 12*c* can be made approximately equal to the height of the permanent magnet 8, the magnetic flux from the permanent magnet 8 is uniformly expanded toward the inner yoke 12*c*, and a symmetric property of a distribution of the magnetic flux density in the height direction (the z direction) applied to the focusing coil 3 and the tracking coil 4 is improved. Further, even if the objective lens 1 moves in the focusing direction (the z direction), it is possible to inhibit a magnitude of a driving force generated in the focusing coil 3 and the tracking coil 4 from being changed.

Since the openings 15 and 15*b* guiding the laser light to the objective lens 1 are formed in the bottom plate portions 11*b* and 12*b* of the first yoke 11 and the second yoke 12, the inner yoke 12*c* can be arranged only in a position from the edge of the opening 15 to an outer edge of the first yoke. However, since the bottom plate portion 11*b* of the first yoke 11 has no limit in the tracking direction (the y direction), it is possible to expand freely the bottom plate portion 11*b*. In accordance with the present embodiment, since the first yoke 11 and the second yoke 12 are overlapped, it is possible to enlarge a cross sectional area of the magnetic path connected to the inner yoke 12*c*, and an efficiency of the magnetic circuit is improved.

Both of the first yoke 11 and the second yoke 12 are formed by punching the openings 15 and 15*b* for the laser light in a center portion of one plate member by means of a press molding or the like. Thereafter, it is preferable that the inner yoke 12*c* or the outer yoke 11*a* is formed by bending the bending portions formed in two opposing lines, whereby a working can be easily executed. Further, since each of the bottom plate portions 11*b* and 12*b* is connected in a flat surface manner, an assembling accuracy is improved. Since the notch portion 16 to which the inner yoke 12*c* of the second yoke 12 is fitted is formed in the opening 15 of the bottom plate portion 11*b* of the first yoke 11, it is easy to position the second yoke 12 in the x direction and the y direction.

In this case, in accordance with the present embodiment, the second yoke 12 is fitted from the lower side of the first yoke 11, however, the second yoke 12 may be fitted from the upper side of the first yoke 11. Since it is sufficient that the first yoke 11 and the second yoke 12 are magnetically connected, it is not necessary that an entire surface is brought into contact with each other, but they may be close to each other. In this case, in the case that the entire surface is brought into contact with each other, a reliability of the magnetic circuit is of course improved.

In the present embodiment, the thickness of the second yoke 12 and the thickness of the first yoke 11 are equal to each other while taking a workability into consideration. However, if the thickness of the second yoke is made thinner than the thickness of the first yoke 11, the thickness of the inner yoke 12*c* becomes thin, and the dimension in the tracking direction of the lens holder 2 becomes small. In this case, the objective lens driving apparatus can be made compact. Since the driving force generated in the focusing coil and the tracking coil is increased by employing the objective lens driving apparatus in accordance with the present embodiment, it is possible to easily track to the optical disc rotating at a high speed. Accordingly, the optical disc apparatus can record and reproduce the information at a high speed.

Embodiment 2

Figure 4:
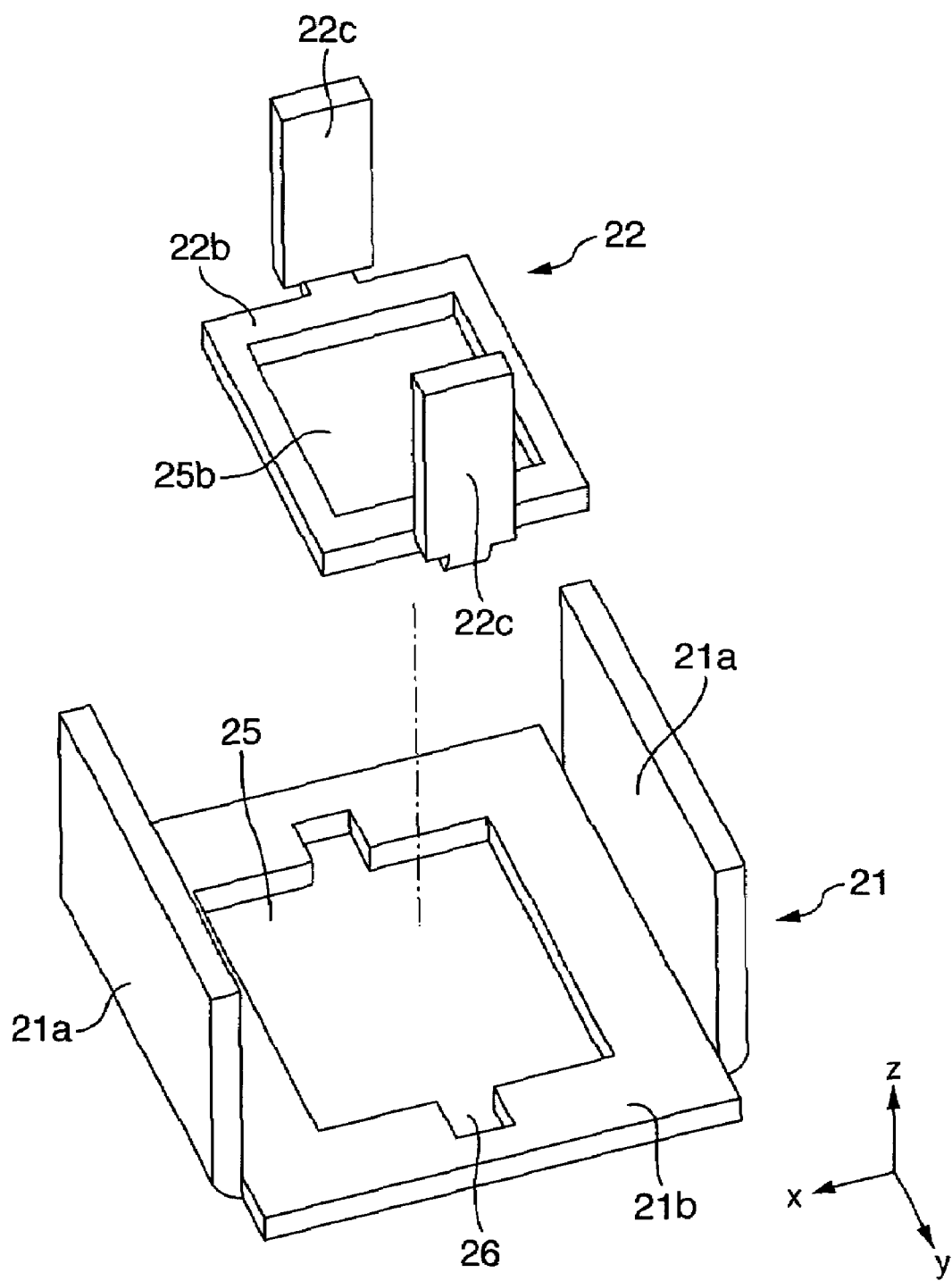
FIG. 4 is an exploded perspective view of the other embodiment of a yoke portion in accordance with the present invention.

A description will be given of the other embodiment of a yoke 20 in accordance with the present invention with reference to FIGS. 4 and 5. FIG. 4 is an exploded perspective view of the yoke 20, and FIG. 5 is a perspective view of an assembly thereof. In the present embodiment, as is different from the embodiment shown in FIG. 1, an area of an opening 25 of a first yoke having an outer yoke 21*a* is made large, and a bottom surface portion 22*b* of a second yoke 22 is fitted to the opening 25. Further, in order to prevent the second yoke 22 from taking out from the opening 25 of the first yoke 21, a width in an x direction of a notch portion 26 formed in the opening 25 of the first yoke 21 is made narrower than a width in an x direction of an inner yoke 22c.

In other words, an anglewise protruding portion is formed in a lower portion of the inner yoke 22c, and the heights of the first yoke 21 and the second yoke 22 are positioned by aligning the protruding portion with the bottom plate portion 21b of the first yoke 21. The second yoke 22 can be easily positioned in the x direction and the y direction only by bringing the bottom plate portion 22b of the second yoke 22 into contact with or close to the inner side of the opening of the bottom plate portion 21b of the first yoke 21.

In accordance with the present embodiment, since the bottom plate portion 22b of the second yoke 22 is arranged in the inner side of the opening 25 formed in the bottom plate portion 21b of the first yoke 21, and the bottom plate portion 21b of the first yoke 21 and the bottom plate portion 22b of the second yoke 22 are aligned in height, it is possible to secure a cross sectional area required for the magnetic path connected to the inner yoke 22c to drive the objective lens 1. Accordingly, it is possible to make the objective lens driving apparatus thin.

Embodiment 3

Figure 6:
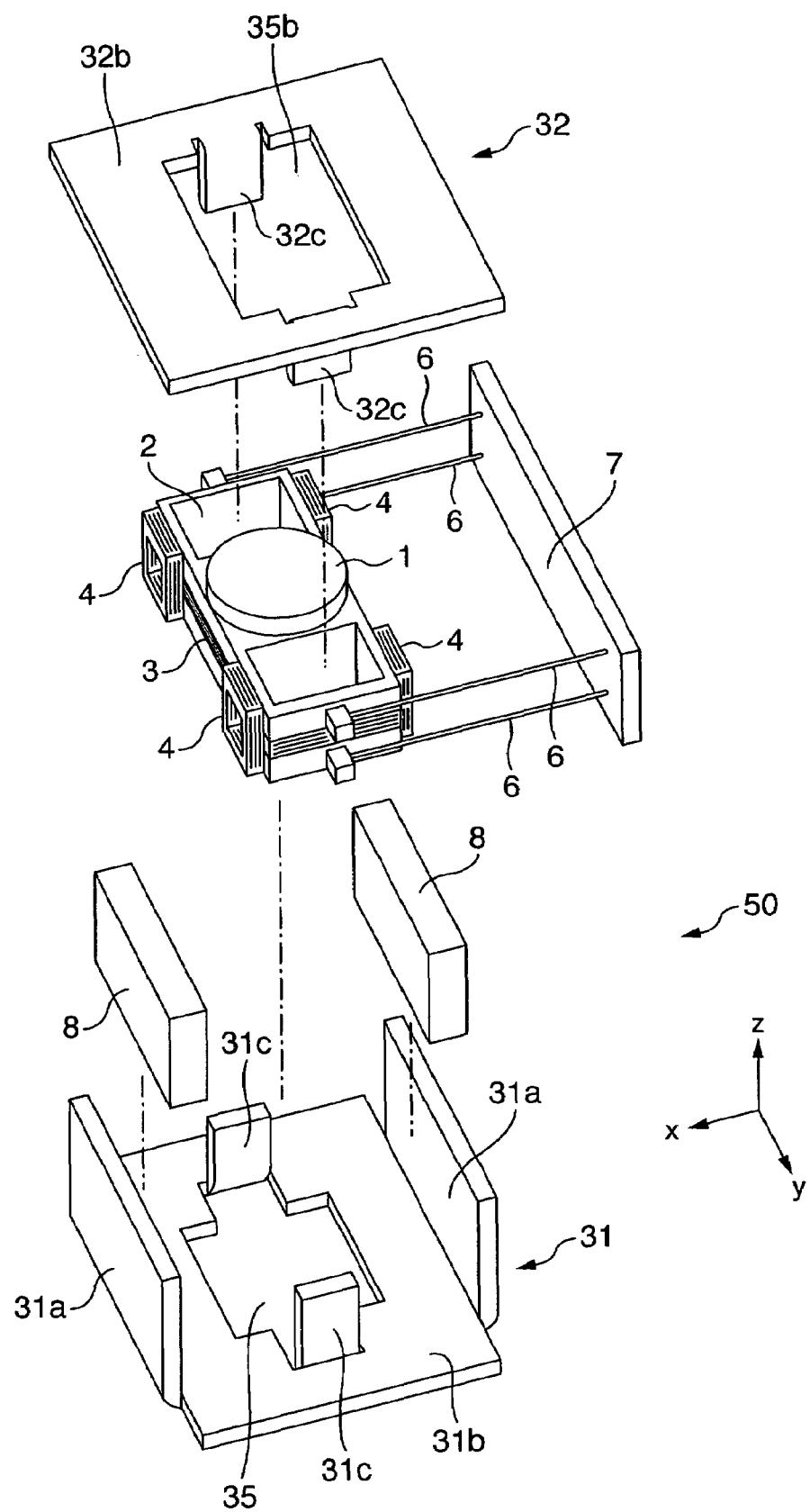
FIG. 6 is an exploded perspective view of the other embodiment of the objective lens driving apparatus in accordance with the present invention.
Figure 7:
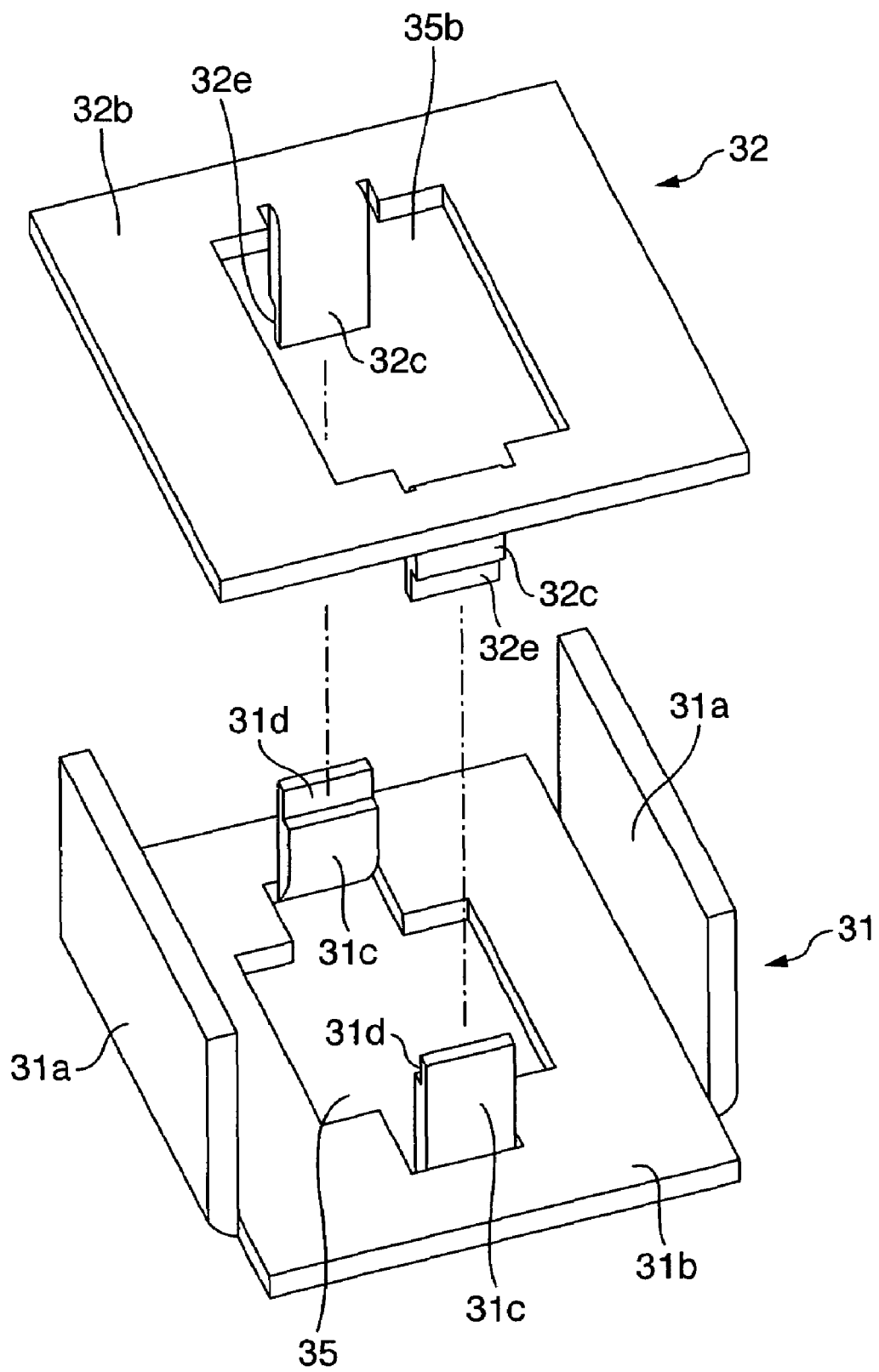
FIG. 7 is an exploded perspective view of a modified embodiment of a yoke portion shown in FIG. 6.

A description will be given of further the other embodiment of the yoke in accordance with the present invention with reference to FIGS. 6 to 8. FIG. 6 is an exploded perspective view of an objective lens driving apparatus 50, and FIGS. 7 and 8 are exploded perspective views of a yoke. In these drawings, the yoke is constituted by two yoke members in the same manner as the embodiments mentioned above, however, a direction of combining the yokes is different from each of the embodiments.

The yoke 50 has a lower yoke 31 and an upper yoke 32. The lower yoke 31 is approximately the same as the first yoke 11 described in the embodiment 1, however, a first inner yoke 31c is also formed in this lower yoke 31. The first inner yoke 31c is formed at a time of forming an opening 35 in a bottom plate portion 31b, and is formed by bending a part of the bottom plate portion 31b in the same direction as an outer yoke 31a.

In the upper yoke 32, a shape of a bottom plate portion 32b is approximately the same as that of the lower yoke 31, however, the outer yoke formed in the lower yoke is not formed in the upper yoke 32. However, an opening 35b is formed in the bottom plate portion 32b by bending a second inner yoke 32c from the bottom plate portion 32b downward in the drawing. The first inner yoke 31c and the second inner yoke 32c are formed approximately corresponding positions, and they cooperatively acts as the inner yoke. The bottom plate portion 32b of the upper yoke 32 is arranged in an upper side of the lens holder 2.

Since the first inner yoke 31c and the second inner yoke 32c are formed by being bent from the bottom plate portions 31b and 32b, each of the inner yokes 31c and 32c is limited in height. Accordingly, a length required in the inner yoke is secured by arranging the lower yoke 31 and the upper yoke 32 vertically and bringing the respective inner yokes 31c and 32c into contact with each other. Therefore, it is possible to form a magnetic circuit in which a magnetic flux density distribution is nearly symmetrical vertically and it is possible to inhibit the magnitude of the driving force from being changed.

The contact position between the first inner yoke 31c and the second inner yoke 32c is set to approximately center of the bottom plate portion 31b of the lower yoke 31 and the bottom plate portion 32b of the upper yoke 32. Accordingly, the magnetic flux from the permanent magnet 8 flows approximately uniformly through the first and second inner yokes 31c and 32c, and the magnetic flux density distribution becomes closer to the vertically symmetrical state. Since the first and second inner yokes 31c and 32c are bent from the inner side in the tracking direction, it is possible to easily expand the width of the bottom plate portion 31b of the lower yoke 31 and the upper plate portion 32b of the upper yoke 32 to an outer side in the tracking direction, it is possible to secure the width required in the magnetic path, and an efficiency of the magnetic circuit is improved.

In order to more securely bring the first and second inner yokes 31c and 32c into contact with each other, an example in which the contact portion is formed in a faucet shape is shown in FIG. 7. A step portion 31d is formed in the first inner yoke 31c, and an inverse step portion 32e corresponding to the step portion 31d is formed in the second inner yoke 32c. The lower yoke 31 and the upper yoke 32 are brought into contact with each other in a flat surface formed by the step portion 31d of the first inner yoke 31c and the step portion 32e of the second inner yoke 32c. Accordingly, it is easy to position the lower yoke 31 and the upper yoke 32, and an assembling property is improved.

The further embodiment of the yoke is shown in FIG. 8 as an exploded perspective view. In the present embodiment, a yoke 42 is formed by two right and left yokes 41 having the same shape. An outer yoke 41a forming a pair of opposing flat surfaces and an inner yoke 41c forming a pair of opposing flat surfaces are formed by combining the yokes 41 alternately. The outer yoke 41a is constituted by a flat plate which is parallel to the focusing direction and the tracking direction. The inner yoke 41c is constituted by a flat plate which is perpendicular to the tracking direction. A convex portion 41d and a concave portion 41e combined with each other are formed in a bottom plate portion 41b of the yoke 41. A magnetic circuit is structured by combining the convex portion 41d and the concave portion 41e in each of the yokes and arranging each of the yokes 41 so as to be rotationally symmetrical with respect to the optical axis of the objective lens.

In accordance with the present embodiment, neither the width of opposing two lines of the bottom plate portion 41b is limited for forming the opening 45, nor the inner yoke cut from the opening 45 is limited. In other words, since only one surface of inner yoke 41c is formed in one yoke 41, the height and the thickness are not limited even if the inner yoke 41c is raised up from the inner side of the bottom plate portion 41b. As a result, it is possible to extend the height of the inner yoke 41c to the same level of height as the outer yoke 41a, and it is possible to make the magnetic flux density distribution in the height direction (the z direction) symmetrical. Accordingly, it is possible to inhibit the magnitude of the driving force in the objective lens driving apparatus from being changed.

In accordance with the present embodiment, since the inner yoke 41c is raised up from the inner side of the bottom plate portion 41b, it is possible to easily extend the width of the bottom plate portion 41b to the outer side in the tracking direction, and it is possible to improve an efficiency of the magnetic circuit while securing the width of the magnetic path. Further, it is possible to easily position two yokes 41 only by combining the convex portion 41d and the concave portion 41e in each of the yokes 41, whereby an assembling property is improved. Since two yokes 41 are arranged in a rotationally symmetrical manner, it is possible to form the yoke 42 by using the same yoke 41, so that the kind of the parts is not increased.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An objective lens driving apparatus comprising:
   a first yoke; and
   a second yoke;
   wherein the first yoke has a flat plate portion parallel to a focusing direction and a tracking direction, an opening is formed in a bottom plate portion of the first yoke, the second yoke has a flat plate portion parallel to the tracking direction, an opening is formed in a bottom plate portion of the second yoke; and
   wherein the flat plate portion of the second yoke is formed in a shape bent from an outer edge of the bottom plate portion of said second yoke, and the flat plate portion of said second yoke is fitted to a notch portion adjacent to the opening of said first yoke.

2. An objective lens driving apparatus as claimed in claim 1, wherein the bottom plate portion of said first yoke and the bottom plate portion of said second yoke are arranged so as to be overlapped.

3. An objective lens driving apparatus as claimed in claim 1, wherein the bottom plate portion of said second yoke is brought into contact with an inner side of the opening of said first yoke or arranged close thereto.

4. An objective lens driving apparatus comprising:
   a first yoke; and
   a second yoke;
   wherein the first yoke has an outer yoke parallel to a focusing direction and a tracking direction, and a first inner yoke perpendicular to the tracking direction, an opening is formed in a bottom plate portion of the first yoke, the second yoke has a second inner yoke perpendicular to the tracking direction, an opening is formed in a bottom plate portion of the second yoke, and the first inner yoke and the second inner yoke are connected.

* * * * *